United States Patent [19]

Porsander et al.

[11] Patent Number: 4,670,641
[45] Date of Patent: Jun. 2, 1987

[54] MACHINE ROBOT, PARTICULARLY FOR WELDING

[75] Inventors: Thord Porsander; Karl Sohlberg; Jan Jonson, all of Västerås, Sweden

[73] Assignee: Asea Aktiebolag, Västerås, Sweden

[21] Appl. No.: 665,855

[22] Filed: Oct. 29, 1984

[30] Foreign Application Priority Data

Oct. 31, 1983 [SE] Sweden .................................. 8305973

[51] Int. Cl.⁴ ............................................. B23K 9/12
[52] U.S. Cl. ............................. 219/125.1; 219/124.34; 901/10; 901/42; 318/609
[58] Field of Search ........................ 219/125.1, 124.34; 901/42, 23, 9, 10; 318/596, 609

[56] References Cited

U.S. PATENT DOCUMENTS

| | | | |
|---|---|---|---|
| 3,781,626 | 12/1973 | Kubo et al. | 901/9 |
| 3,845,284 | 10/1974 | Taguchi et al. | 901/9 |
| 3,906,323 | 9/1975 | Ono et al. | 901/23 |
| 3,942,088 | 3/1976 | Yosioka et al. | 318/609 |
| 3,946,297 | 3/1976 | Bechtel | 318/609 |
| 4,014,495 | 3/1977 | Oda et al. | 901/42 |
| 4,030,617 | 6/1977 | Richter | 901/42 |
| 4,520,301 | 5/1985 | Suzuki | 318/609 |

Primary Examiner—Clifford C. Shaw
Attorney, Agent, or Firm—Pollock, Vande Sande & Priddy

[57] ABSTRACT

A welding robot having a robot arm which is servo-controlled in a multiplicity of degrees of freedom. At least one servo-system for one of the degrees of freedom is capable of disengaging a part of its feedback network, this part being an integrating circuit, whereby the adjustment from PI-type passes to P-type. The arm then becomes sprung in a direction away for a set-point value with respect to this freedom of movement. When used for welding, the welding gun used and attached to the robot arm is provided with a holding-off or fender arrangement, such as wheels, and is drawn by the servo-system towards a set-point value which it is unable to attain because of the shape of the workpiece, whereupon the wheel is caused to press against the workpiece with spring force, and to follow the shape of a weld joint as it is made, irrespective of whether the joint is uneven or not.

5 Claims, 8 Drawing Figures

MACHINE ROBOT, PARTICULARLY FOR WELDING

FIELD OF THE INVENTION

The invention relates to a machine robot, particularly for welding.

BACKGROUND OF THE INVENTION

Automatic welding apparatus of this kind are known and have, inter alia, been designed and produced by applicants in cooperation with ESAB, of Gothenburg, Sweden. In this respect there is used a robot arm of our design which has six separate servo-controlled axes of rotation, or freedoms of movement, and a programmable data processing system. Seated on one end of the robot arm is an automatically controlled welding gun, which can be moved by the arm along a programmed path in three-dimensional space. The data processing system is arranged to produce at each moment, and for each rotational axis/degree of freedom, a set point value. In view of the fact that the individual servo-systems guide the end of the arm in movements which, for structural or design reasons, follow circular arcuate paths with radii of mutually different values for different arm positions, it is assumed that, for example, a programmed rectilinear path is, in actual fact, comprised of a polygonal-like path made up of small circular-arcs. Be this as it may, it is possible with this known construction to readily weld straight and curved joints, as required, with great precision.

It is often the case, however, that the workpieces to be welded have been produced with far less precision than the precision represented by the robot arm, which leads to particular problems. For example, it may be desired to weld a joint between two plates which do not meet evenly, but which deviate one from the other, due to irregularities in the plates or due, for example, to the fact that when two curved or rounded plates are to be welded together the automatic welding process requires a higher degree of precision with respect to the workpiece than is justified with respect to the precision required of the finished product.

Consequently, when welding with the aid of such automatic welding apparatus, it is desirable to be able to take into account the individual and unforeseeable shape of the workpiece, by being able to follow the actual joint to be welded, as is possible when welding manually.

SUMMARY OF THE INVENTION

This problem is solved in accordance with the invention by providing at least one of the servo-systems controlling the movement of the robot arm with means for disengaging, or decreasing, the otherwise active integrating factor incorporated in the feedback loop of the control means.

It is well known that in control systems where feedback is solely effected by the difference between the real and set-point values there is obtained a control error which is inversely proportional to the amplification of the control loop. It is also well known that this control error, this built-in deviation, is normally eliminated by incorporating in the control loop an integrating circuit, such that the sum of the difference between real value and set-point value and a value of this difference which has been integrated over a given period of time is applied to the input of the amplifier of the servo-system. Normally, this integration is effected with a heavier weighting for later deviations, often via an integrated RC-circuit with suitable time constant.

Thus, in accordance with the invention it becomes possible, at least in respect of one of the aforesaid degrees of freedom, to disengage this integrating factor from the control system or to dampen the effect of said factor. It is then possible to program the path of movement of the robot arm so that the welding gun falls "inwardly of" or "beneath" the desired path of the weld joint, whereupon the welding gun will be urged towards the workpiece by the servo-system. If there is then provided a holding-off means, or fender means, such as a skid, a wheel, or a roller, arranged to hold-off against the workpiece, this holding-off means will move along the workpiece while bearing thereagainst at a pressure which is proportional to the difference between the real value and the unreachable set-point value, and to the amplification factor of the servo-system. Suitably, the machine robot is programmed so that one of its rotational axes extends at right angles to the direction in which the weld is to be made. This axis may suitably be an axis which lies far out on the robot arm, since rotational axes which lie adjacent the robot attachment point produce torques of varying magnitudes with varying extents of arm extension. Alternatively, the amplification factor can be caused to vary by an amount commensurate with the extent to which the arm is extended.

With certain welding-path configurations it can be difficult to obtain a rotational axis which extends at right angles, or substantially at right angles to a programmed movement path. In such cases the integrating factor can be disconnected in two separate servo-systems, each controlling a respective rotational axis. When the joint being welded itself exhibits good movement-control characteristics, such as is the case of a fillet weld between two angled plates, this "slack" in the robot arm caused by the absence of integration in two degrees of freedom presents no particular problems. The same applies to a butt weld between two heavily chamfered plates, where the presence of a guiding channel for the holding-off means can effectively determine the weld joint.

If the workpiece lacks such tracking or guiding ability, however, and if it is impossible to achieve a pressing effect at approximately right angles to the surface of the workpiece with the aid of only one of the rotational axes, it is possible to provide a compensated integrating effect, such that the integrating effect is only achieved in respect of positional errors comprising lateral errors relative to the desired weld path. This is achieved by providing each of two servo-systems with respective means for disengaging the integrating effect, and by providing a calculating circuit which calculates two component signals, each constituting a weighted sum of the difference between the real values and set-point values of the two systems, these component signals, subsequent to integration, each being applied to a respective servo-system, instead of integrated system-inherent signals. For example, if the two degrees of freedom define a given angle therebetween and all the weighting factors are one (1), the combination of the two servo-systems can be made to function in accordance with the invention in the direction of the bisector of said systems, while having full PI-controlling (Proportional Integral Control) effect at right angles thereto.

BRIEF DESCRIPTION OF THE DRAWINGS

The invention will now be described in more detail with reference to several embodiments thereof shown by way of example in the accompanying drawings, in which.

DETAILED DESCRIPTION

Figure 1:
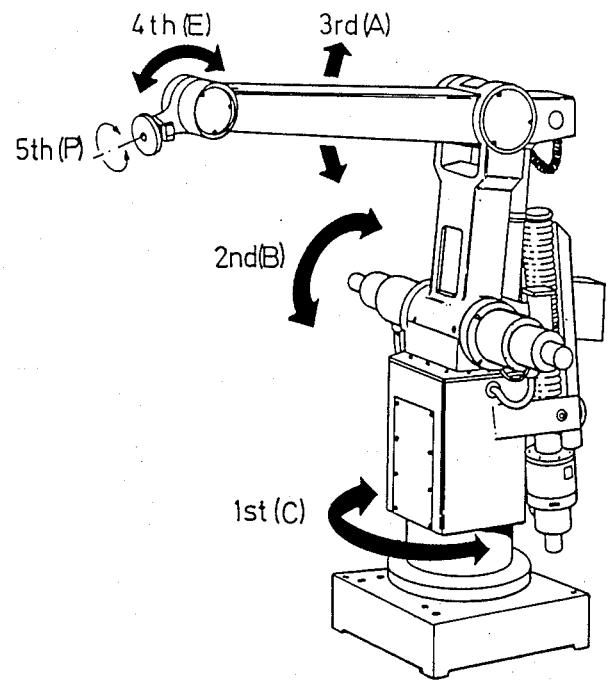
FIG. 1 illustrates a robot arm and the degrees of freedom thereof.

FIG. 1 illustrates a robot arm belonging to our model IRB6. The arm has five axes of rotation, or degrees of freedom, about which the arm can be swung. Although not shown in the figure, each rotary axis has a motor and a position-sensing resolver connected thereto, these being controlled through a data programming unit. Since this robot arm is known and, together with similar robot arms, is widely found on the market, there is no reason to describe the arm in detail here.

Figure 2:
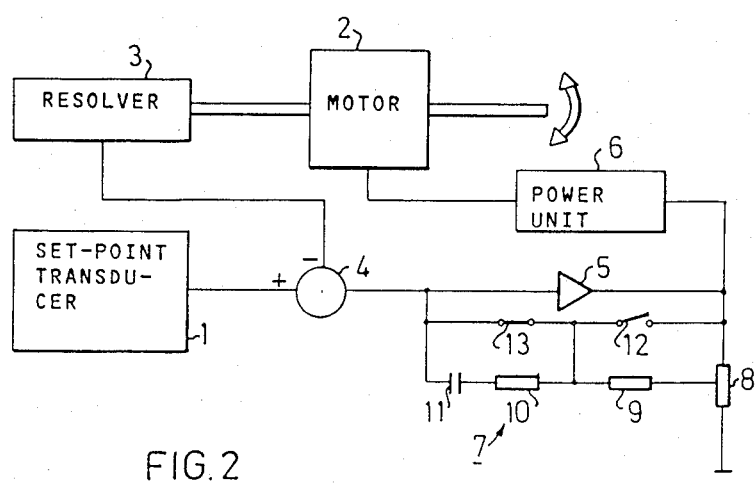
FIG. 2 illustrates schematically a control circuit for one of the motors of a robot arm.

FIG. 2, however, illustrates schematically a servo-system for one of the rotational axes of a robot arm. The rotary position of the motor 2 is sensed by a transducer 3, called a resolver. Although this normally operates in the analog mode and the control system is mainly digital, those circuits required for analog-digital conversion have not been shown, for the sake of simplicity. Thus, for the purpose of this description there is assumed the simplification that the resolver 3 produces a real-position signal which is compared with a set-point signal produced by a set-point transducer 1. In actual fact the error signal here as deriving from the circuit 4 arrives from an A/D-circuit which co-acts with the data processor (not shown). Consequently, FIG. 2 is to be understood as being a schematic illustration of the principle of a feedback.

The error signal is passed to an amplifier, shown schematically at 5, and its output signal is passed to a drive unit 6, from which the motor 2 is supplied with drive current. Connected to the amplifier 5 is a feedback network 7, which is provided with switches 12 and 13, by means of which the network can be switched over. The resistor 10 and the capacitor 11 form an integrating circuit, while the resistors 8 and 9 form a resistive network. When the switch 13 is closed, the integrating circuit is by-passed and solely a P-control (Proportional Behavior) is obtained. Normally the integrating circuit is coupled-in, however, and provides a PI-control.

As is known, PI-control is normally required to obtain good control behavior, so that the set-point value is achieved. Otherwise, return towards the set-point value will cease before this value has been reached.

According to the invention, however, there is utilized a particular property of a P-control, in that it is possible to exert an external torque on the rotational axis of the motor, whereupon the motor attempts to counteract this torque while generating a counterforce which is proportional to the positional error caused by said external torque. Thus, when using such a servo-system, the motor will behave with a spring-force effect. This is utilized in accordance with the invention by setting a set-point value which cannot be achieved due to geometric coercive conditions, wherewith a force is exerted against the workpiece.

When applying the invention, a conventional welding gun is connected to the end of a robot arm, such as the arm illustrated in FIG. 1. It will be seen from FIG. 1 that the rotation axes provide five degrees of freedom. When applying the invention, at least one of the rotational axes is suitably provided with a switchable servo according to FIG. 2. If, for example, the degree of freedom referenced 2nd(B) is provided with this inventive modification, welding according to the invention can be effected in a direction at right angles to, or substantially at right angles to the direction of this axis.

Figure 3A:
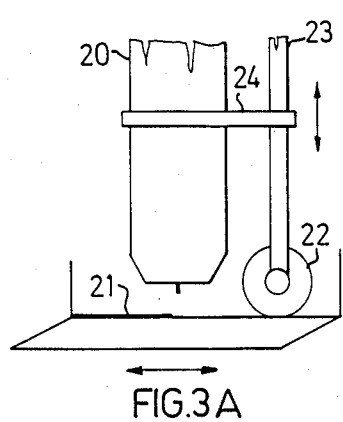
FIGS. 3A–C and 4A–B illustrate examples of holding-off or fender means.
Figure 3B:
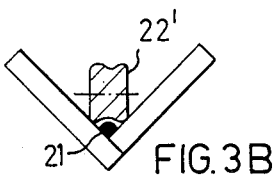
Figure 3C:
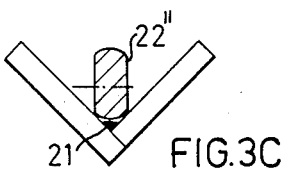

Because the welding gun is to bear against the workpiece and to be drawn therealong against the action of friction, the end of the gun is provided with suitable fender means, or like holding-off means, in accordance with the invention. Such fender means may have the form of a skid, or simply an edge on the welding gun itself, although it preferably has the form of a wheeled device or roller device whereby the frictional forces can be reduced. FIGS. 3A, 3B and 3C and FIGS. 4A and 4B show suitable means for this purpose. FIGS. 3A, 3B and 3C illustrate in this respect embodiments which incorporate a single wheel which holds off the gun from the actual weld or its extension, this embodiment being preferably used in connection with a fillet joint. A fillet-joint weld is referenced 21 in the figures, and a welding gun 20 is mounted on a robot arm (not shown). Seated on the gun 20 is a holder 24 which co-acts with a rod 23, which can be adjusted to different settings and which has a wheel 22 journalled on one end thereof. In the embodiment illustrated in FIG. 3B, the wheel 22' is provided with a groove which permits free passage of the weld, when wishing to work in shifting weld directions, and which will also provide room for pre-formed tack welds. The embodiment illustrated in FIG. 3C has a wheel 22" which lies directly against the location at which a weld is later to be made.

Figure 4A:
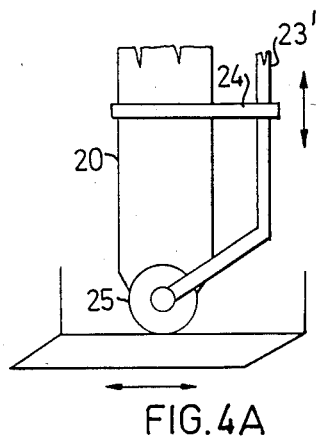
Figure 4B:
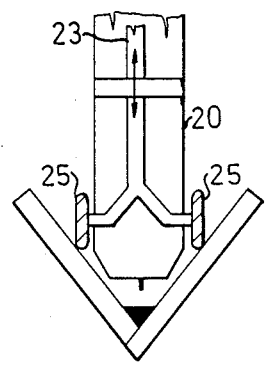

FIGS. 4A and 4B illustrate a further embodiment which includes two rotatable wheels 25. These wheels are mounted on a vertically adjustable rod 23' which is attached in a manner similar to that described with reference to FIG. 3A, although in this case the rod 23' is bifurcated and a wheel 25 is mounted on each bifurcation branch, said wheels being intended to bear against both parts of the workpiece, which is to be welded with a fillet joint.

Figure 5:
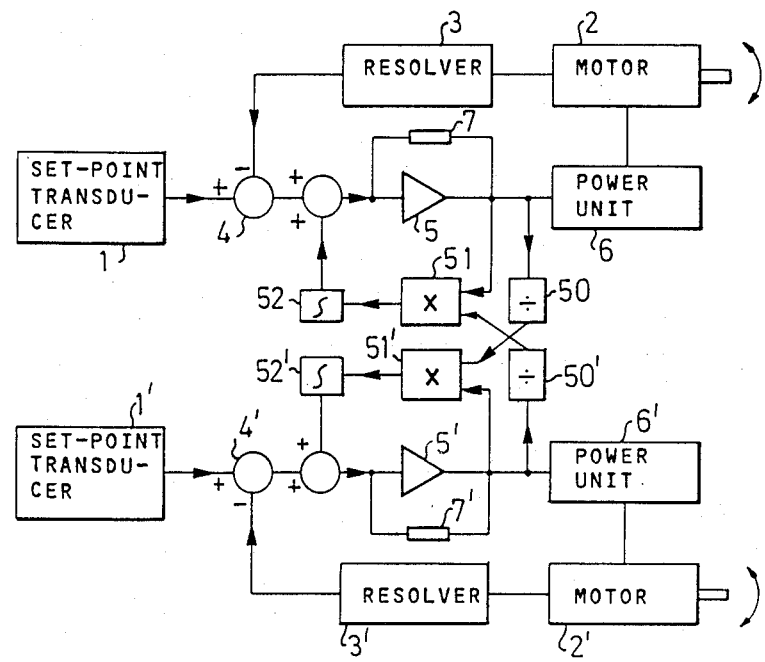
FIG. 5 illustrates schematically a servo which is "soft" in one resultant direction of two servo-controlled rotational axes.

FIG. 5 illustrates schematically an embodiment of a servo-system in which the movements for two individual degrees of freedom are coordinated with respect to the integrating factor. Those components which are common to the FIG. 2 embodiment are identified by the same references, although the switching possibility (12,13) of the FIG. 2 embodiment has not been shown, 7 and 7' being shown as a functional resistance network. Thus, for the sake of simplicity, FIG. 5 does not show the switching possibilities afforded by the present invention.

In addition to a P-network there is also provided a particular combined I-network in the form of divider networks 50,50' for taking out adjustable proportions of the control errors, which are multiplied in multiplication circuits 51,51' by an error factor for the one or the other control error factor, whereafter the results are processed in integrating circuits 52,52' and totalled, for supply to the inputs of respective amplifiers. In this way the servo-effect is reinforced, seen in a plane defined by the two degrees of friction, in a direction determined by the adjustable constants K, K', while the spring-effect according to the invention is obtained in another direction, at an angle thereto. It will be understood that, when applying this principle, attention must be paid to the configuration of the robot arm, since the various rotary axes of the arm act with mutually different lever lengths. The above description will more than suffice to enable one of normal skill in this art to adapt a robot arm and its control circuits to suit each particular requirement.

In many cases, however, the position of the workpiece can be adjusted in relation to the configuration of the robot arm, in a manner such as to obtain flexibility, due to the absence of I-control, in the direction most suitable with respect to the configuration of the workpiece, for example towards the channel in which a fillet weld is to be made.

In the foregoing mention has been made solely to welding. The invention, however, can be applied in many other fields, such as deburring, the application of glue, putty and the like, etc..

The invention has been described in a general way. It will be understood, however, that one of normal skill in this art will be able to make any number of modifications, to meet those requirements he is faced with in practice. And although the invention has been described with respect, for example, to fillet welds, it can be applied successfully in all cases where the shape of the workpieces provides suitable guide surfaces, for example with coarse butt welds, where the existing chamfers define a V-shaped channel.

The invention can also be applied in particular when in the multiple production of workpieces different workpieces may to some extent differ from one another or be uneven or the like, where allowance for such tolerances can suitably be made by giving the actual material an external shape which will act so as to guide the location of a weld in the weld cavity.

What we claim is:

1. A machine robot, particularly intended for welding, comprising a movable robot arm carrying a weld electrode for arc welding and controlled by servo-means for movement in a plurality of degrees of freedom, a servo-control for each degree of freedom of said arm incorporating a servo-system which, upon comparison by means of a calculating circuit between a measured real value and a predetermined setpoint value, controls motor means in a manner which causes the real value to approach the setpoint value, the setpoint values for the various degrees of freedom being obtained from a data processor, and respective servo-systems having a feedback loop which is both proportional and integral as a function of time, said feedback loop having, in at least one of said servo-systems, means for disconnecting or reducing an integrating factor in said control, said at least one servo-system also including means for changing its setpoint value, and said arm being provided at a location close to the weld-electrode site with holding-off means arranged to bear-off against a workpiece to be welded, where the setpoint is set to a value corresponding to an arm position which the arm is prevented from reaching by said holding-off means.

2. A robot according to claim 1, wherein two of the servo-systems, each corresponding to a respective degree of freedom, are each provided with means for disconnecting the integrating factor in the control and in that error signals from the two control systems are applied to a calculating circuit for producing two component signals constituting weighted sums of said error signals, two integrating means for integrating respective weighted sums, and means for transferring each of the thus weighted and integrated error signals to its respective servo system, to be there added to its controlling error signal, whereby there is obtained a servo-adjustment in the absence of an integrating factor in a direction equivalent to a vector sum of a first vector corresponding to a first degree of freedom and a second vector corresponding to a second degree of freedom.

3. A robot according to claim 1, wherein such holding-off means comprises at least one wheel whose axle extends at right angles to a given welding direction of the weld electrode.

4. A robot according to claim 3, comprising two mutually parallel wheels.

5. A robot according to claim 1, wherein said hold-off means comprises a roller.

* * * * *